United States Patent
Eun et al.

(10) Patent No.: US 7,916,266 B2
(45) Date of Patent: Mar. 29, 2011

(54) METHOD OF ADJUSTING AMOUNT OF LIQUID CRYSTAL IN A LCD DEVICE INCLUDING REDUCING THE THICKNESS OF A SEAL MEMBER TO FORM A REPAIR REGION BY LASER HEATING A METAL PATTERN THEREUNDER

(75) Inventors: Chong Chan Eun, Paju-si (KR); Sang Ho Park, Paju-si (KR); Tae Man Kim, Paju-si (KR); Jun Beom Cho, Anseong-si (KR); Chang Gun Song, Gangdong-gu (KR)

(73) Assignee: LG Display Co., Ltd., Seoul (KR)

( * ) Notice: Subject to any disclaimer, the term of this patent is extended or adjusted under 35 U.S.C. 154(b) by 781 days.

(21) Appl. No.: 11/635,747

(22) Filed: Dec. 7, 2006

(65) Prior Publication Data

US 2007/0296907 A1    Dec. 27, 2007

(30) Foreign Application Priority Data

Jun. 26, 2006    (KR) .................. 10-2006-0057193
Jun. 26, 2006    (KR) .................. 10-2006-0057196

(51) Int. Cl.
G02F 1/13            (2006.01)
(52) U.S. Cl. ................ 349/192; 349/153; 349/190
(58) Field of Classification Search ............. 349/153, 349/154, 187, 190, 192
See application file for complete search history.

(56) References Cited

U.S. PATENT DOCUMENTS

| | | | |
|---|---|---|---|
| 4,610,510 A | 9/1986 | Funada et al. | |
| 2004/0246429 A1* | 12/2004 | Liu et al. ............ | 349/153 |
| 2005/0219454 A1 | 10/2005 | Lee | |
| 2005/0275792 A1 | 12/2005 | Chen et al. | |

FOREIGN PATENT DOCUMENTS

| | | |
|---|---|---|
| DE | 10 2006 030 011 A1 | 4/2007 |
| GB | 2427926 | 1/2007 |
| JP | 56-155920 | 12/1981 |

OTHER PUBLICATIONS

Combined Search and Examination Report dated May 2, 2007 for corresponding Great Britain Application No. GB0624413.1.
Office Action issued in corresponding Chinese Patent Application No. 2006101629406; issued Jun. 27, 2008.
Office Action issued in corresponding German Patent Application No. 10 2006 057 767.1; mailed Nov. 18, 2009.

* cited by examiner

*Primary Examiner* — John Heyman
(74) *Attorney, Agent, or Firm* — Brinks Hofer Gilson & Lione

(57) ABSTRACT

A method for adjusting an amount of liquid crystal in a liquid crystal display (LCD) device includes injecting a liquid crystal into a liquid crystal receiving space. The liquid crystal receiving space is disposed between a first substrate, a second substrate that faces the first substrate, and a sealing member interposed between the first and second substrates. The method for adjusting an amount of liquid crystal in a liquid crystal display (LCD) device further includes reducing a thickness of the sealing member at a predetermined portion of the sealing member to form a repair region, and pressurizing the liquid crystal to break the sealing member at the repair region to discharge some of the liquid crystal from the liquid crystal receiving space, so as to adjust the amount of the liquid crystal in the liquid crystal receiving space. The method for adjusting an amount of liquid crystal in a liquid crystal display (LCD) device also includes resealing the broken repair region of the sealing member.

6 Claims, 9 Drawing Sheets

METHOD OF ADJUSTING AMOUNT OF LIQUID CRYSTAL IN A LCD DEVICE INCLUDING REDUCING THE THICKNESS OF A SEAL MEMBER TO FORM A REPAIR REGION BY LASER HEATING A METAL PATTERN THEREUNDER

This application claims priority to Korean Patent Application Nos. 57193/2006, filed on Jun. 26, 2006, and 57196/2006, filed on Jun. 26, 2006, both of which are incorporated herein by reference.

FIELD

The present invention relates to a method for adjusting the amount of liquid crystal in a liquid crystal display (LCD) device, and more particularly, to a method for adjusting the amount of liquid crystal in an LCD device for precisely controlling excessively injected liquid crystal.

BACKGROUND

An information processing apparatus that can quickly process a large amount of data, and a display device that displays data processed by the information processing apparatus as an image are under rapid development.

LCD devices are the most representative display devices. LCD devices display an image using liquid crystal. Liquid crystal changes its molecular arrangement when an electric field is applied (an electrical behavior) and transmits light at different light transmitting indices (transmittances) depending on its molecular arrangement (an optical behavior).

For displaying an image using liquid crystal, an LCD device includes a liquid crystal controlling part that controls the arrangement or alignment of liquid crystal molecules and a light providing part that provides light to the liquid crystal controlling part.

The liquid crystal controlling part includes a pair of facing substrates and a liquid crystal layer formed between the substrates. The substrates generate an electric field for driving the liquid crystal layer. Generally, the liquid crystal layer has a very thin thickness of about several micrometers.

The thin liquid crystal layer is formed between the substrates by a vacuum injection method, a drop filling method, and so on.

In the vacuum injection method, a vacuum is formed between the substrates and then liquid crystal is injected between the substrates. In the drop filling method, liquid crystal is dropped onto one of the substrates and then the other substrate is coupled to the substrate where the liquid crystal is dropped.

However, when the liquid crystal is not sufficiently injected between the substrates, a void can be formed between the substrates. In this case, an image is not displayed at the void.

On the other hand, when the liquid crystal is excessively injected between the substrates, the liquid crystal moves down by gravity when the LCD device is placed in an upright position. In this case, an image is not properly displayed at a lower portion of the LCD device.

SUMMARY

According to one embodiment of the present invention, a method for adjusting an amount of liquid crystal in a liquid crystal display (LCD) device includes injecting a liquid crystal into a liquid crystal receiving space. The liquid crystal receiving space is disposed between a first substrate, a second substrate that faces the first substrate, and a sealing member interposed between the first and second substrates. The method for adjusting an amount of liquid crystal in a liquid crystal display (LCD) device further includes reducing a thickness of the sealing member at a predetermined portion of the sealing member to form a repair region, and pressurizing the liquid crystal to break the sealing member at the repair region to discharge some of the liquid crystal from the liquid crystal receiving space, so as to adjust the amount of the liquid crystal in the liquid crystal receiving space. The method for adjusting an amount of liquid crystal in a liquid crystal display (LCD) device also includes resealing the broken repair region of the sealing member.

In another aspect of the present invention, there is provided a method for adjusting the amount of liquid crystal in a liquid crystal display (LCD) device. The method includes injecting a liquid crystal into a liquid crystal receiving space. The liquid crystal receiving space is disposed between a first substrate, a second substrate that faces the first substrate, and a sealing member interposed between the first and second substrates. The method further includes disposing a mask on the first substrate. The mask includes an opening corresponding to a metal member that overlaps the sealing member. The method also includes irradiating a light onto the metal member through the opening of the mask to narrow a portion of the sealing member to form a repair region, pressurizing the liquid crystal to discharge some of the liquid crystal from the liquid crystal receiving space through the repair region of the sealing member, and resealing the repair region of the sealing member.

According to another embodiment of the present invention, an LCD panel comprises a first substrate, a second substrate that faces the first substrate, with a liquid crystal disposed between the first and second substrates, and a sealing member interposed between the first and second substrates. The LCD panel further comprises a liquid crystal receiving space. The liquid crystal receiving space is disposed between the first substrate, the second substrate that faces the first substrate, and the sealing member interposed between the first and second substrates. The LCD panel also comprises a mask on the first substrate. The mask includes an opening corresponding to a metal member that overlaps the sealing member. The LCD panel further includes a repair region. The repair region is a portion of the sealing member that is narrowed by a light irradiated onto the metal member through the opening of the mask. Some of the liquid crystal from the liquid crystal receiving space is discharged through the repair region of the sealing member.

According to yet another embodiment of the present invention, an LCD apparatus comprises an LCD panel and a case that supports the LCD panel. The LCD panel comprises a first substrate, a second substrate that faces the first substrate, with a liquid crystal disposed between the first and second substrates, and a sealing member interposed between the first and second substrates. The LCD panel further comprises a liquid crystal receiving space. The liquid crystal receiving space is disposed between the first substrate, the second substrate that faces the first substrate, and the sealing member interposed between the first and second substrates. The LCD panel also comprises a mask on the first substrate. The mask includes an opening corresponding to a metal member that overlaps the sealing member. The LCD panel further includes a repair region. The repair region is a portion of the sealing member that is narrowed by a light irradiated onto the metal member through the opening of the mask. Some of the liquid crystal from the liquid crystal receiving space is discharged through the repair region of the sealing member.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
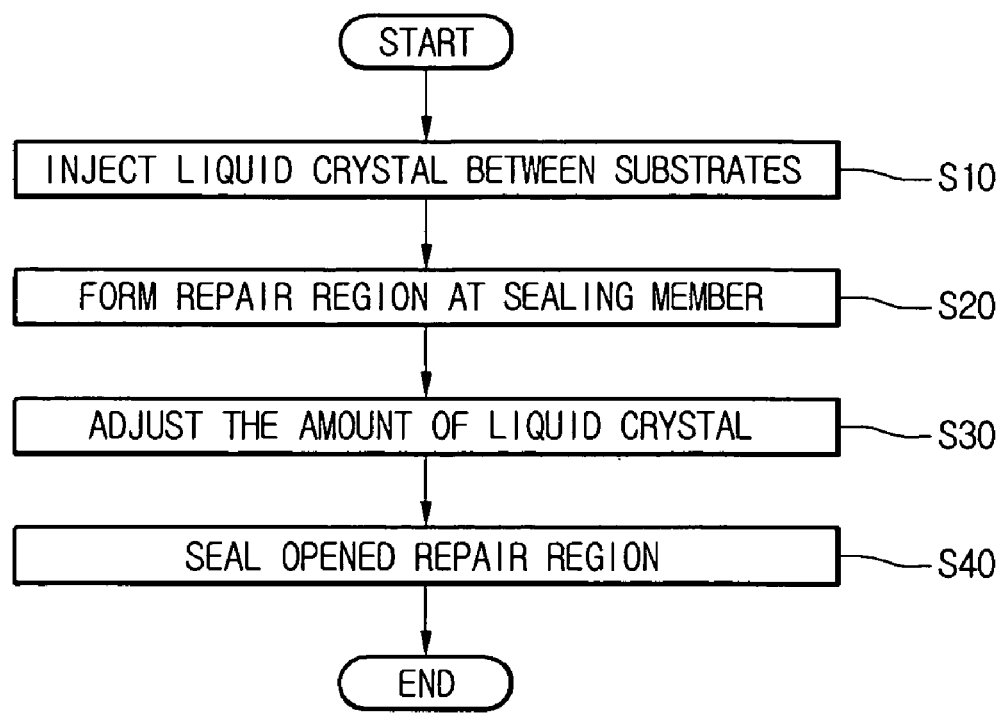
FIG. 1 is a flowchart for explaining a method for adjusting the amount of liquid crystal in an LCD device according to a first embodiment of the present invention.

A method for adjusting the amount of liquid crystal in an LCD device will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, dimensions of a first substrate, a second substrate, a sealing member, liquid crystal, a repair region, a mask, and other elements and structures are exaggerated for clarity. It will also be understood that when an element or structure, such as a first substrate, a second substrate, a sealing member, liquid crystal, a repair region, or a mask, is referred to as being "on", "above", or "under" another element or structure, it can be directly on, above or under another element or structure, or intervening elements or structures may also be present. Further, it will be understood that although the terms first and second are used herein to describe various elements or structures (e.g., a first substrate or a second substrate), these elements or structures should not be limited by these terms. These terms are only used to distinguish one element or structure from another element or structure. Therefore, the terms first and second can be used selectively or interchangeably for elements or structures such as substrates. For example, a first substrate could be termed as a second substrate, and similarly, a second substrate could be termed as a first substrate.

Figure 2:
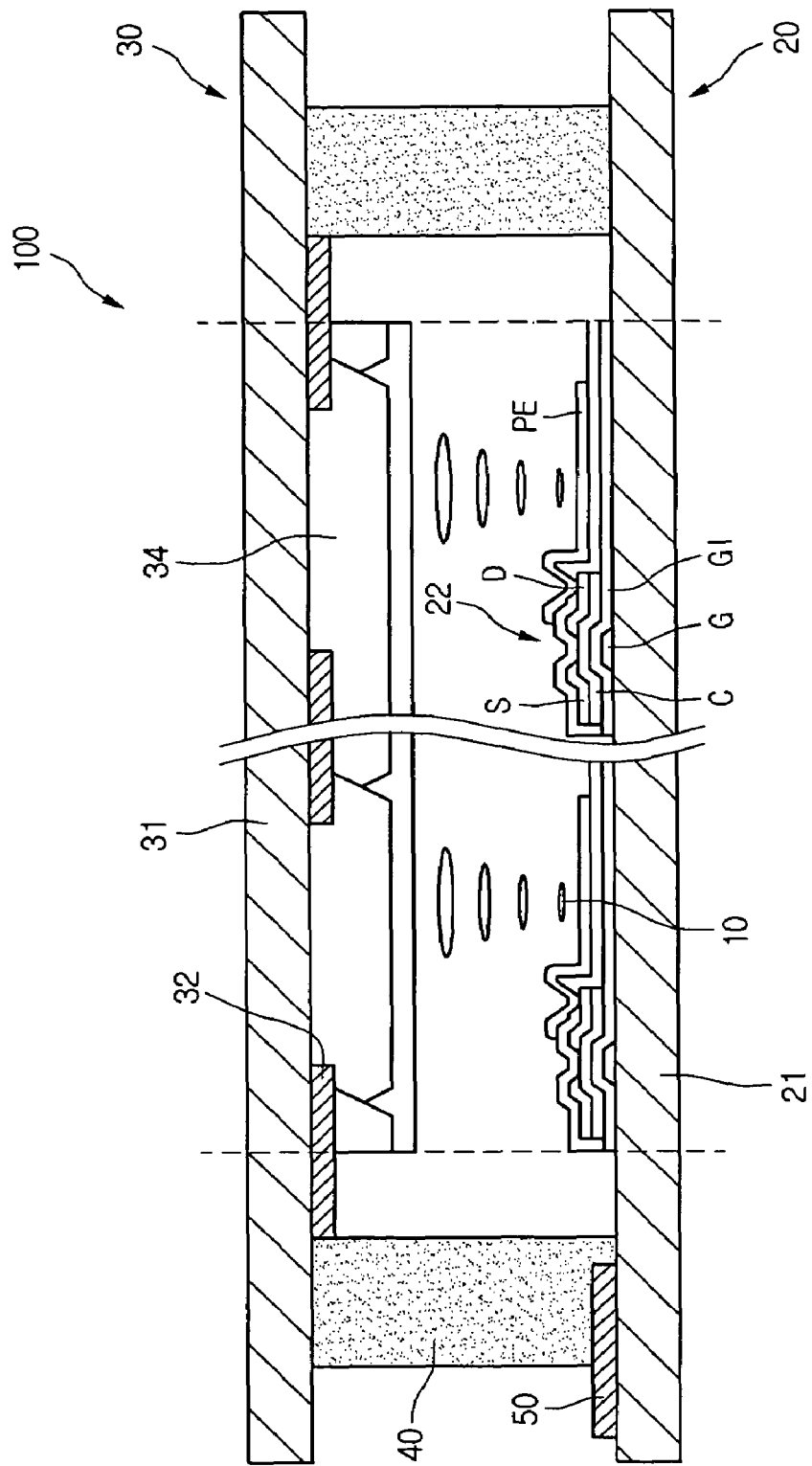
FIG. 2 is a cross sectional view illustrating an LCD device to which the method of FIG. 1 is applied.

FIG. 1 is a flowchart for explaining a method for adjusting the amount of liquid crystal in an LCD device according to a first embodiment of the present invention, and FIG. 2 is a cross sectional view illustrating an LCD device to which the method of FIG. 1 is applied.

Referring to FIGS. 1 and 2, in operation S10, liquid crystal is injected into an LCD device 100 to form a liquid crystal layer 10. Liquid crystal can be injected by a vacuum injection method or a drop filling method.

The LCD device 100 will now be described in detail with reference to FIG. 2.

The LCD device 100 includes a first substrate 20, a second substrate 30, the liquid crystal layer 10, a sealing member 40, and a metal pattern 50.

The first substrate 20 includes a first transparent substrate 21 such as a glass substrate, thin film transistors 22, and pixel electrodes PE.

The thin film transistors 22 are formed on the first transparent substrate 21. According to one embodiment of the present invention, a plurality of thin film transistors is formed on the first transparent substrate 21 in accordance with the resolution of the LCD device 100. For example, when the resolution of the LCD device 100 is 1024×768, 1024×768×3 thin film transistors 22 may be formed on the first transparent substrate 21 in a matrix format.

Each of the thin film transistors 22 includes a gate electrode G connected to a gate line (not shown), a gate insulation layer GI insulating the gate electrode G, a channel pattern C formed on the gate insulation layer GI above the gate electrode G, a source electrode S and a drain electrode D that are formed on the channel pattern C. The channel pattern C may include an n+ amorphous silicon pattern (not shown) formed by ion-doping an amorphous silicon pattern with a conductive impurity to a high concentration.

The source electrode S is connected to a data line (not shown) formed perpendicular to the gate line. The source electrode S and the drain electrode D are formed on the channel pattern C at a predetermined distance from each other.

The pixel electrode PE is electrically connected to the drain electrode D of the thin film transistor 22. According to one embodiment of the present invention, the pixel electrode PE includes a transparent conductive material. The pixel electrode PE may be formed of a material such as an indium tin oxide (ITO), an indium zinc oxide (IZO), or an amorphous indium tin oxide (a-ITO).

The second substrate 30 includes a second transparent substrate 31 such as a glass substrate, a black matrix 32, and a color filter 34.

The black matrix 32 is formed under the second transparent substrate 31. The black matrix 32 may be formed of a material having a high light absorbance such as chrome and a chrome oxide. When viewed from the top in FIG. 2, the black matrix 32 is formed between the pixel electrodes PE formed on the first substrate 20.

Since the pixel electrodes PE of the first substrate 20 are arranged in a matrix format, the black matrix 32 can have a grid shape. The black matrix 32 screens the thin film transistors 22 arranged on the first substrate 20. Further, the back matrix 32 absorbs light incident from the outside, thereby improving the contrast of a displaying image.

The color filter 34 is formed in each opening defined in the black matrix 32. The color filter 34 formed in each opening of the black matrix 32 includes a red (R) color filter transmitting a red light component of white light, a green (G) color filter transmitting a green light component of white light, and a blue (B) color filter transmitting a blue light component of white light.

The sealing member 40 is disposed between the facing first and second substrates 20 and 30. For example, the sealing member 40 can be formed between edges of the first and second substrates 20 and 30 to provide a liquid crystal receiving space between the first and second substrates 20 and 30. According to one embodiment of the present invention, the sealing member 40 may include a photocurable material that is hardened by light such as ultraviolet rays.

The liquid crystal layer 10 is filled in the liquid crystal receiving space formed by the sealing member 40. The liquid crystal layer 10 may include twist nematic liquid crystal, vertical alignment liquid crystal, or the like.

Figure 3:
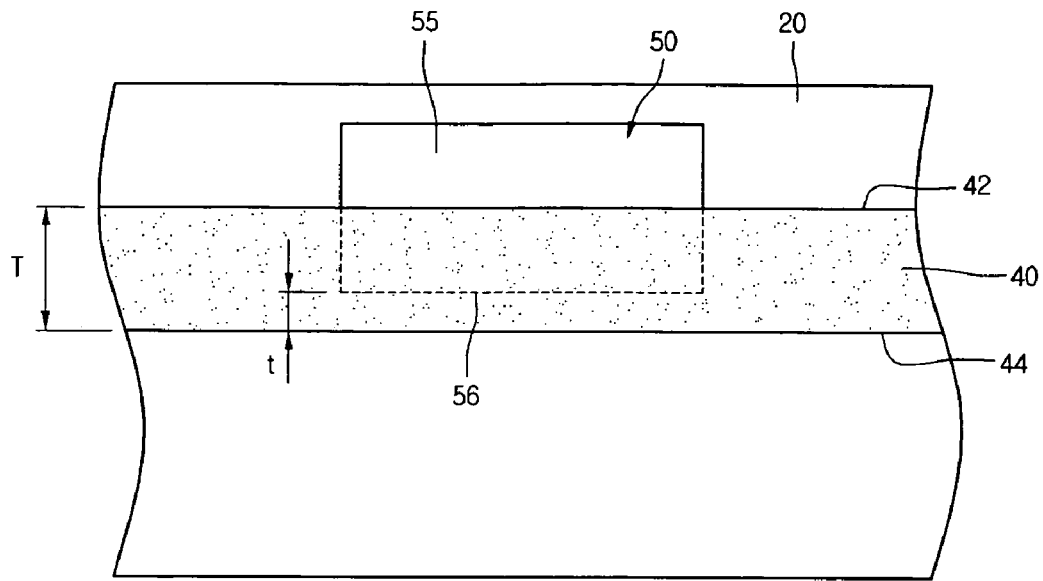
FIG. 3 is a partial sectional view illustrating an arrangement of a metal pattern and a sealing member in the LCD device of FIG. 2.

FIG. 3 is a partial sectional view illustrating an arrangement of the metal pattern 50 and the sealing member 40.

Referring to FIG. 3, the metal pattern 50 may be formed on the first substrate 20. In detail, the metal pattern 50 is formed between the sealing member 40 and the first substrate 20. The metal pattern 50 has a piece shape. The metal pattern 50 and the sealing member 40 are formed overlapping each other.

The metal pattern 50 is formed at an outer side 42 of the sealing member 40 opposite to an inner side 44 of the sealing member 40 contacting the liquid crystal layer 10. When the thickness of the sealing member 40 is T, the overlapping region between the metal pattern 50 and the sealing member 40 occupies about 85% to 95% of the thickness (T).

Therefore, the non-overlapping region of the sealing member 40 with the metal pattern 50 has a thickness (t) ranging from 5% to 15% of the total thickness T of the sealing member 40. Hereinafter, the overlapping region of the metal pattern 50 with the sealing member 40 will be denoted by reference numeral 56, and the remaining non-overlapping region (exposed region) will be denoted by reference numeral 55.

According to one embodiment of the present invention, the metal pattern 50 may be formed of the same material as the gate electrode G, the source/drain electrodes S and D, or the pixel electrode PE of the thin film transistor 22. That is, the metal pattern 50 can be formed of aluminum, an aluminum alloy, ITO, IZO, or a-ITO.

Referring again to FIGS. 1 and 2, after the liquid crystal layer 10 is formed in the LCD device 100, it is determined whether liquid crystal was excessively injected into the LCD device 100. If so, the excessive amount of the injected liquid crystal is removed from the LCD device 100.

Figure 4:
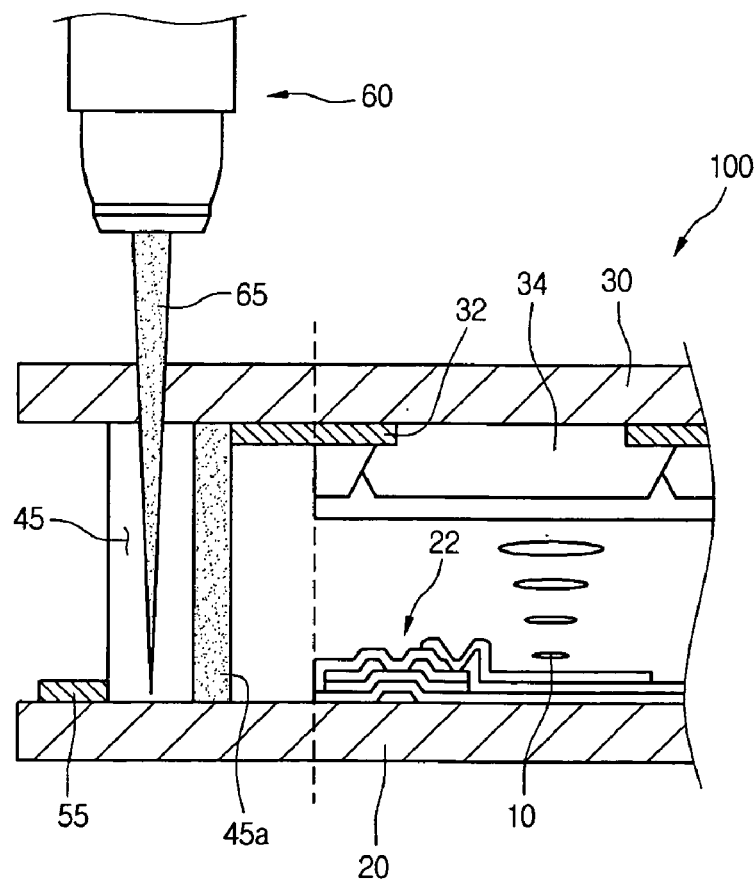
FIG. 4 is a view illustrating removing of an overlapped region between the sealing member and the metal pattern depicted in FIG. 3 by using a laser beam.
Figure 5:
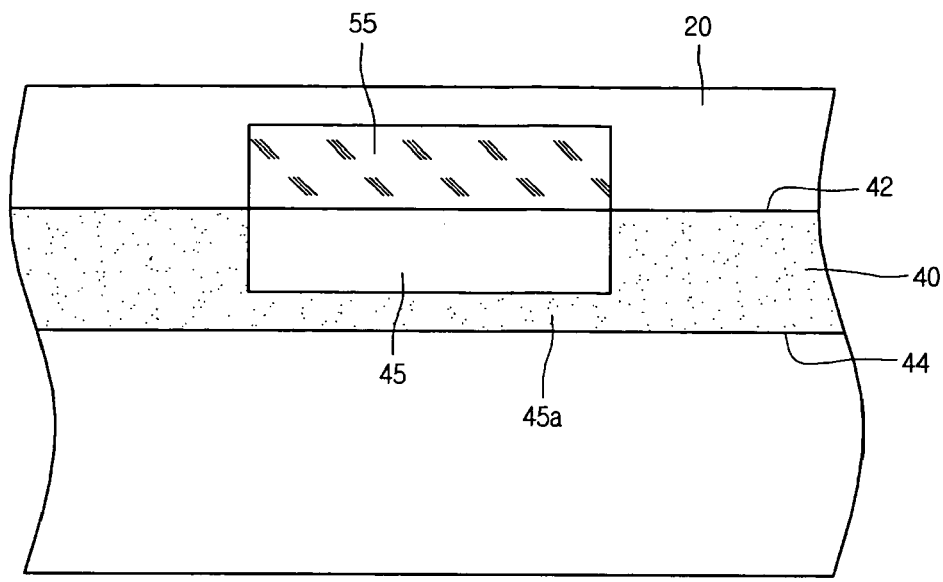
FIG. 5 is a plan view illustrating a repair region of the sealing member.

FIG. 4 is a view illustrating removing of the overlapped region between the sealing member 40 and the metal pattern 50 using a laser beam, and FIG. 5 is a plan view illustrating a remaining region of the sealing member 40.

Referring to FIGS. 1, 4, and 5, in order to adjust the amount of liquid crystal of the liquid crystal layer 10 by discharging the excessive amount of the liquid crystal from the liquid crystal layer 10, a repair region 45 is formed at the sealing member 40 in operation S20.

Referring to FIG. 4, a laser beam generating device 60 emits a laser beam 65 onto the overlapping region 56 (referred to in FIG. 3) of the metal pattern 50 to form the repair region 45.

According to one embodiment of the present invention, the laser beam 65 is irradiated onto the overlapping region 56 of the metal pattern through the second substrate 30 and the sealing member 40. The laser beam 65 is not absorbed by the second substrate 30 and the sealing member 40 but absorbed mainly by the metal pattern.

To this end, the laser beam 65 has a wavelength in the range of 800 nm to 1,200 nm. When the wavelength of the laser beam 65 is greater than 1,200 nm, the second substrate 30 and the sealing member 40 can be damaged by the light 65. On the other hand, the wavelength of the laser beam 65 is lower than 800 nm, it is difficult to provide sufficient energy to the metal pattern 50 because of a low energy level of the laser beam 65.

Therefore, it is preferable that the wavelength of the laser beam 65 be in the range of 800 nm to 1,200 nm.

When receiving the laser beam 65, the metal pattern 50 is rapidly burnt. Accordingly, a portion of the sealing member 40 corresponding to the overlapping region 56 of the metal pattern 50 is removed together with the metal pattern 50, thereby forming the repair region 45 and a remaining region 45a as shown in FIGS. 4 and 5. The repair region 45 and the remaining region 45a can be formed at the sealing member 40 at two or more places.

According to one embodiment of the present invention, the repair region 45 of the sealing member 40 corresponds to the overlapping region 56 of the metal pattern 50. Since the overlapping region 56 occupies about 85% to 95% of the thickness (T) of the sealing member 40, the sealing member 40 has a thin thickness at the repair region 45. That is, the thickness of the remaining region 45a ranges from 5% to 15% of the thickness (T) of the sealing member.

Referring again to FIG. 1, after the repair region 45 is formed at the sealing member 40, the excessive amount of liquid crystal injected into the liquid crystal layer 10 of the LCD device 100 is adjusted through the repair region 45 in operation S30.

For this adjustment, a pressure is applied to the LCD display 100, and the applied pressure is transmitted to the liquid crystal layer 10. Then, the pressure is transmitted to the remaining region 45a of the sealing member 40. If the pressure acting on the remaining region 45a is larger than the strength of the remaining region 45a, the remaining region 45a is broken.

Then, excessively injected liquid crystal is discharged from the LCD device 100 through the broken remaining region 45a, so that the amount of liquid crystal of the liquid crystal layer 10 can be properly adjusted.

Figure 6:
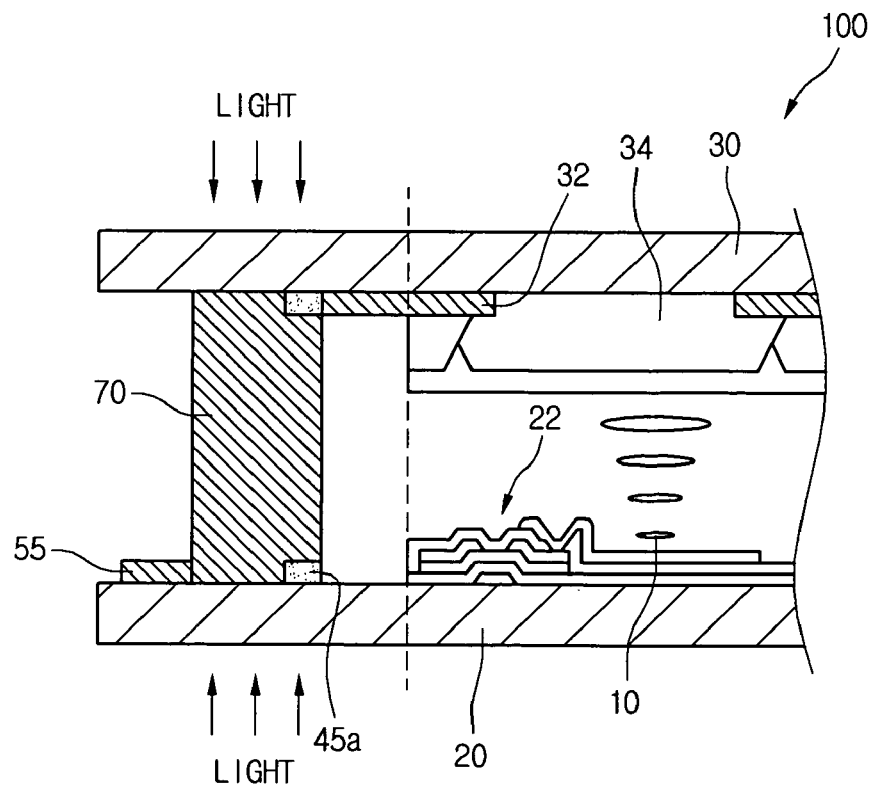
FIG. 6 is a sectional view illustrating resealing of a broken repair region of the sealing member depicted in FIG. 5.

FIG. 6 is a sectional view illustrating resealing of the broken remaining region 45a.

Referring to FIG. 6, to prevent outside air from flowing into the liquid crystal layer 10 through the broken remaining region 45a, a photocurable material 70 is applied to the broken remaining region 45a and then light is irradiated to the photocurable material 70 for resealing the broken sealing member 40 in operation S40. Preferably, the photocurable material 70 may be a UV-curable material hardening by ultraviolet rays.

Figure 7:
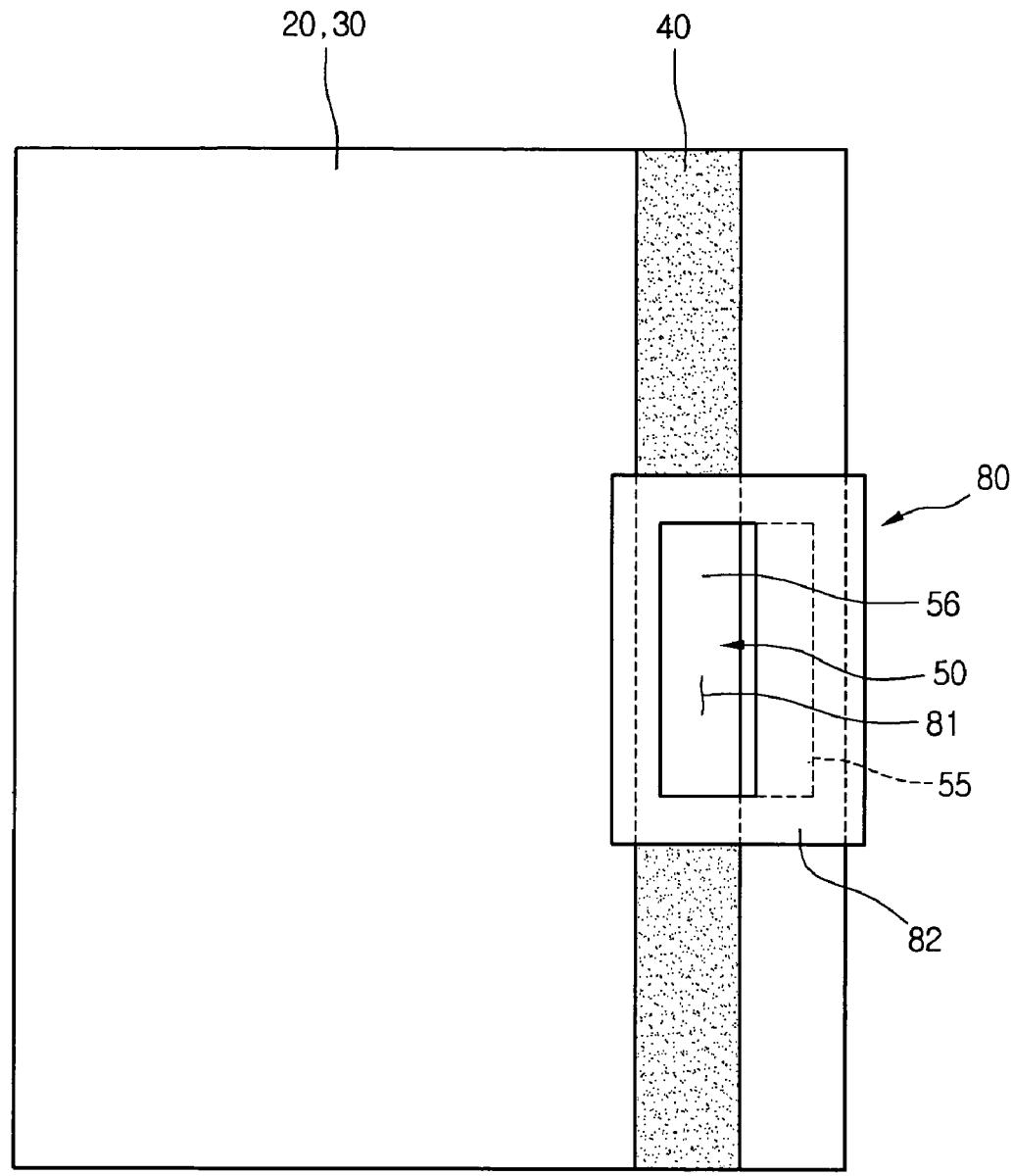
FIG. 7 is a plan view illustrating a mask and a sealing member according to a second embodiment of the present invention.
Figure 8:
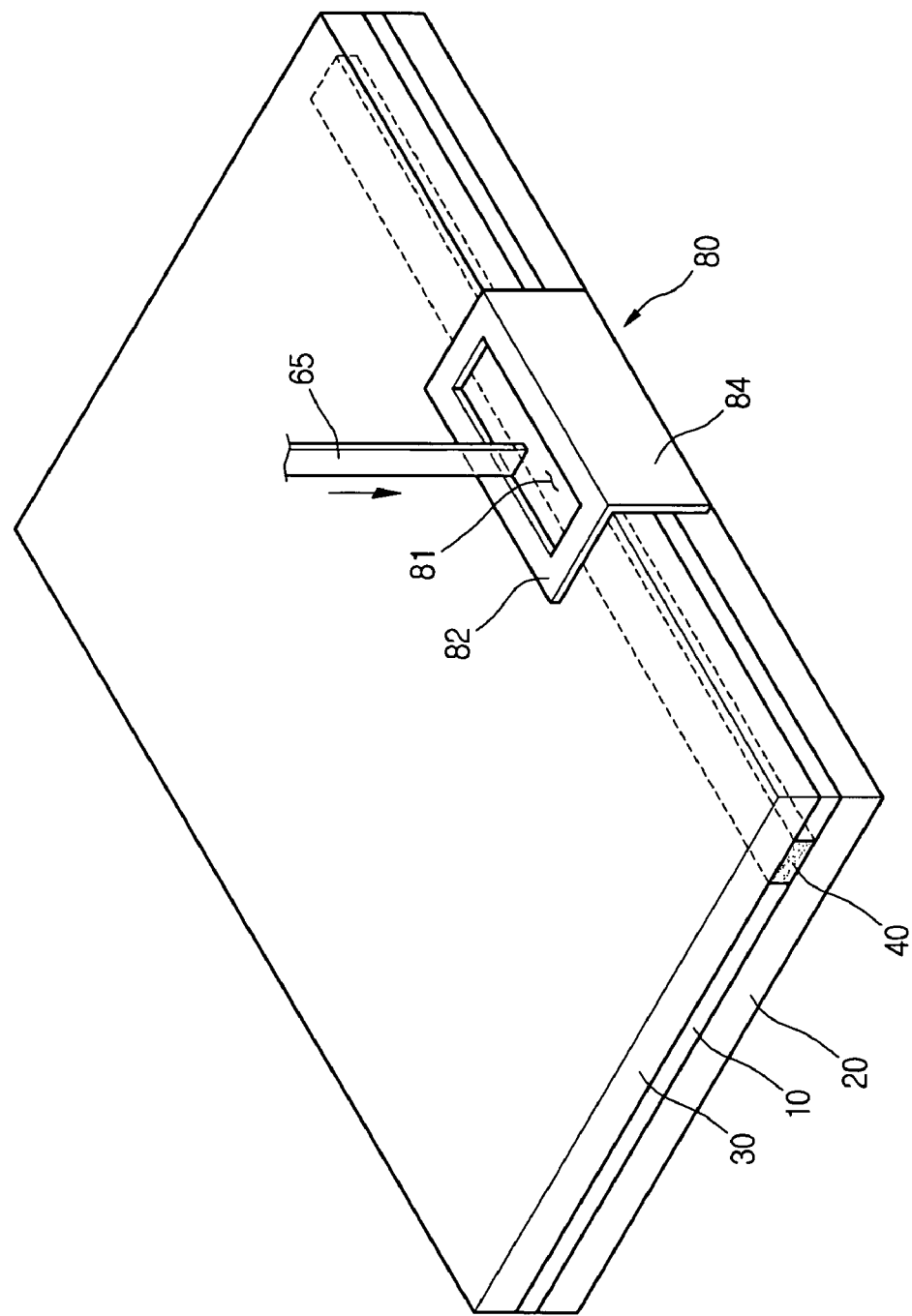
FIG. 8 is a perspective view illustrating the mask and the sealing member depicted in FIG. 7.
Figure 9:
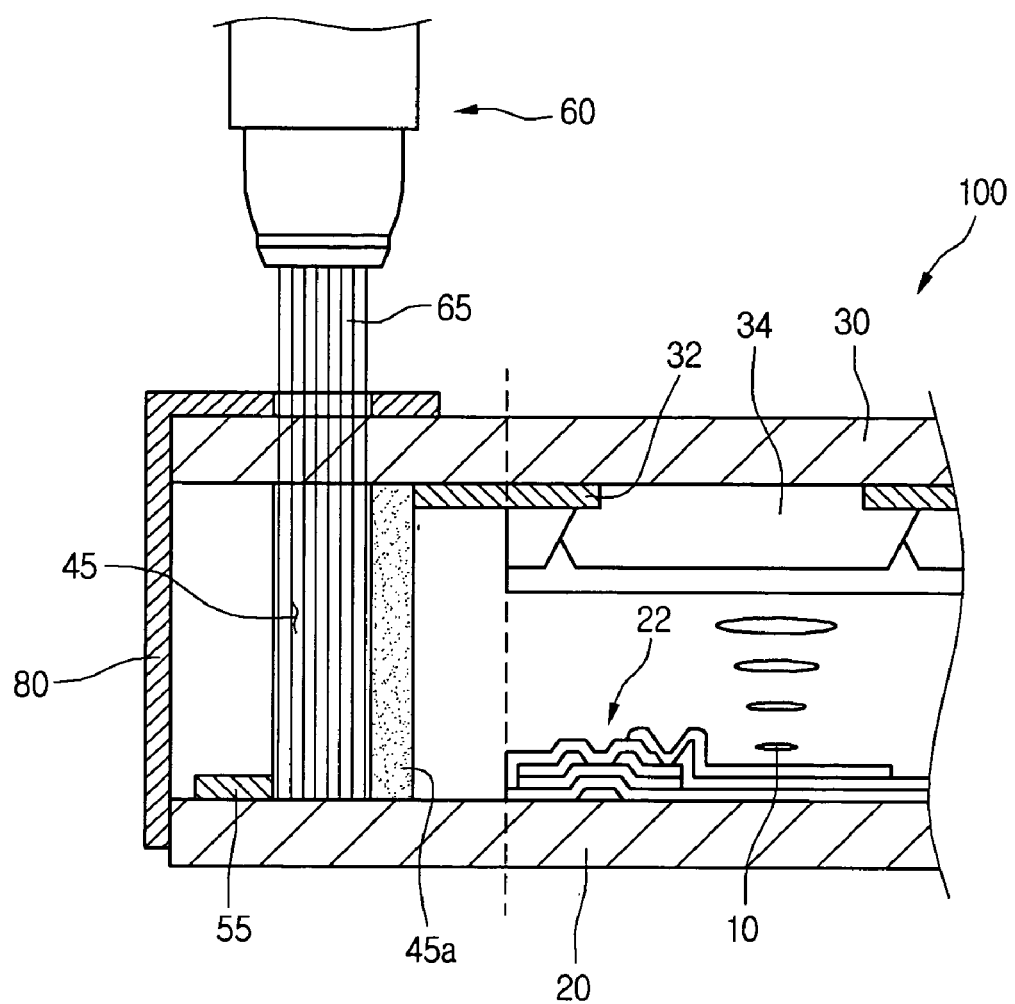
FIG. 9 is a sectional view illustrating a process of forming a repair region using the mask.
Figure 10:
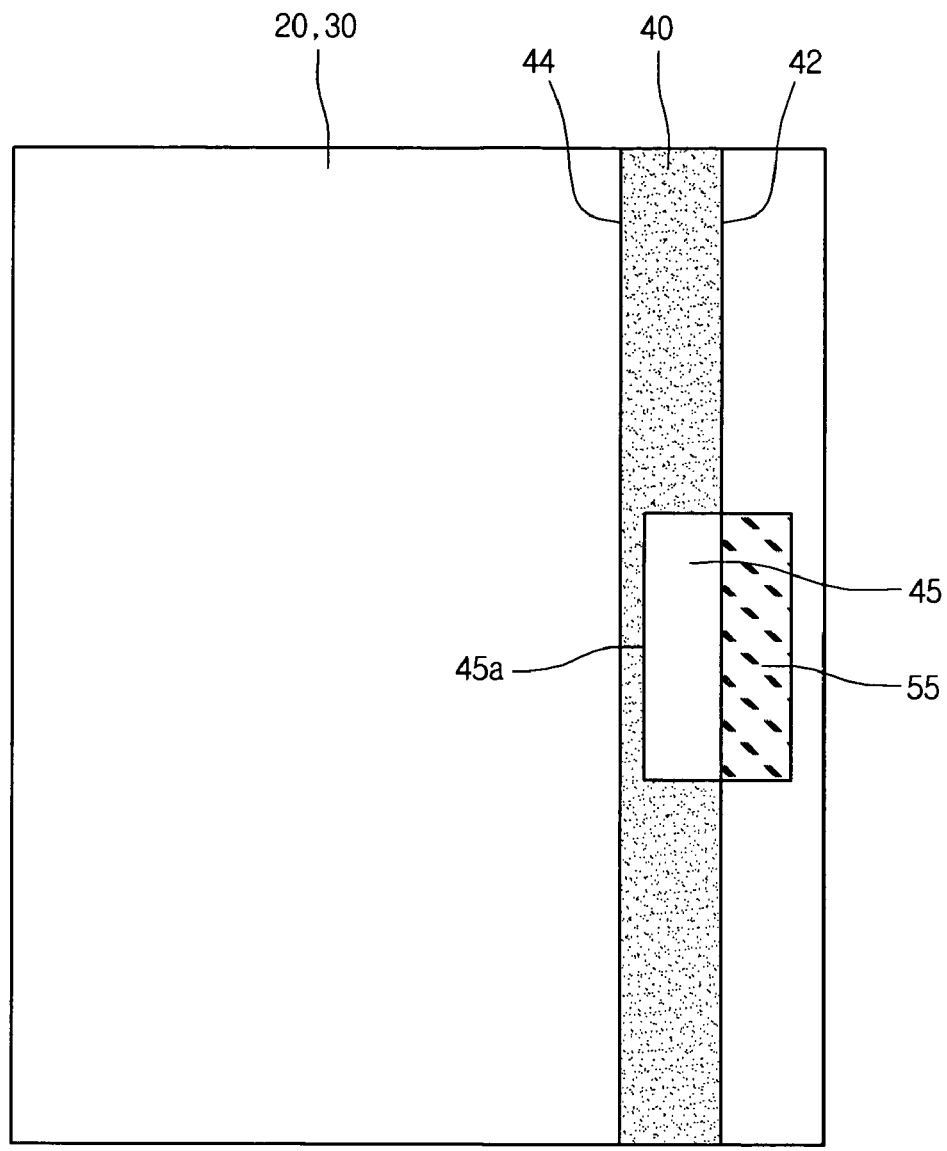
FIG. 10 is a plan view illustrating the repair region formed at the sealing member.
Figure 11:
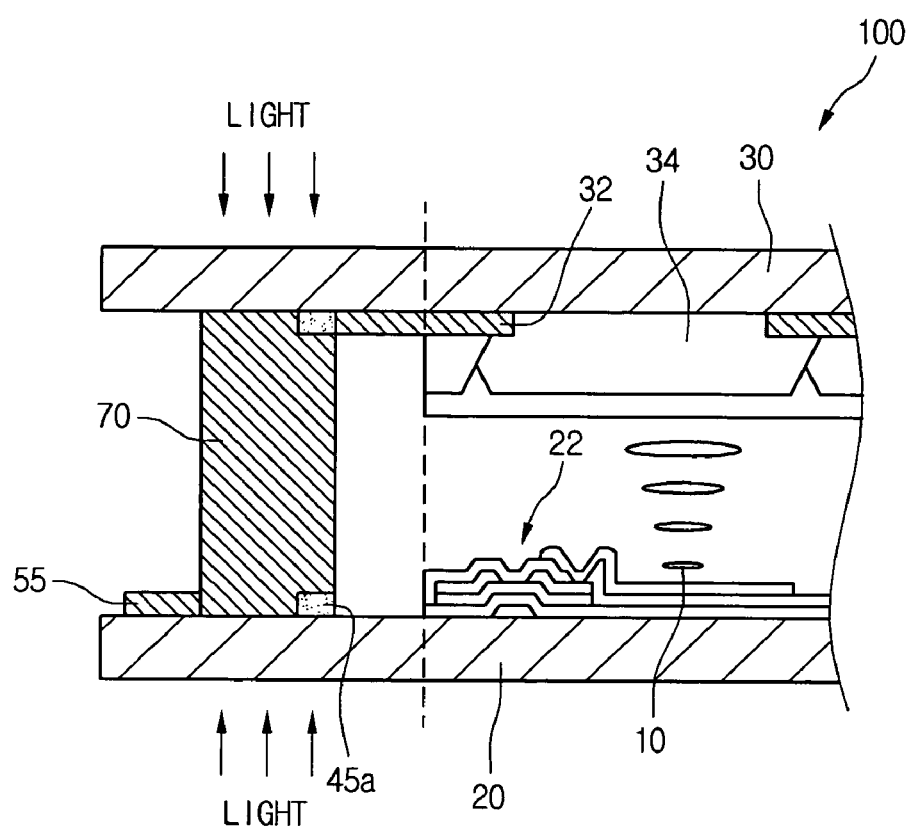
FIG. 11 is a sectional view illustrating resealing of the repair region.

FIG. 7 is a plan view illustrating a mask and a sealing member according to a second embodiment of the present invention, and FIG. 8 is a perspective view illustrating the mask and the sealing member depicted in FIG. 7. FIG. 9 is a sectional view for illustrating a process for forming a repair region using the mask. FIG. 10 is a plan view illustrating the repair region formed at the sealing member. FIG. 11 is a sectional view illustrating resealing of the repair region.

In the second embodiment of the present invention, the liquid crystal display panel, the sealing member, and the metal pattern (member) have substantially the identical structures as in the first embodiment illustrated in FIGS. 1 to 3. Thus, descriptions thereof will be omitted. Further, like reference numerals denote like elements.

Referring to FIGS. 7 and 8, a mask 80 includes a first surface 82 and a second surface 84. Preferably, the mask 80 is formed of a material that is not damaged by a laser beam.

The first surface 82 may be flatly formed along a top surface of the second substrate 30 of the LCD device 100, and the second surface 84 may extend downwardly from an edge of the first surface 82 along a side surface of the second substrate 30. According to one embodiment of the present invention, the first surface 82 and the second surface 84 form an L-shape. The second surface 84 facilitates alignment between an opening 81 (described later) and the overlapping region 56 of the metal member 50 formed under the sealing member 40.

The opening 81 is formed in the first surface 82. The opening 81 may be rectangular. Particularly, the opening 81 is properly sized for alignment with the overlapping region 56 of the metal member 50. The outer side 42 of the sealing member 40, which is opposite to the inner side 44 of the sealing member 40 contacting the liquid crystal layer 10, is exposed by the opening 81. Reference numeral 45 denotes a repair region formed at the sealing member 40.

Referring to FIG. 9, to form the repair region 45, a laser beam 65 generated from the laser beam generating unit 60 is irradiated through the opening 81 formed in the first surface 82 of the mask 80.

Next, the laser beam 65 reaches the overlapping region 56 of the metal member 50 after sequentially passing through the opening 81, the second substrate 30, and the sealing member 40.

Even when the laser beam 65 departs from its optical path due to vibrations or impacts applied to the laser beam generating unit 60 and/or the LCD device 100, the mask 80 having the opening 81 prevents the laser beam 65 from reaching an undesired portion of the sealing member 40.

According to one embodiment of the present invention, the laser beam 65 is not substantially absorbed by the second substrate 30 and the sealing member 40. However, the metal member 50 absorbs most of the laser beam 65, and thus the metal member 50 is rapidly heated.

To effectively form the repair region 45 at the sealing member 40, it is preferable that the laser beam 65 have a wavelength in the range of 800 nm to 1200 nm. When the wavelength of the laser beam 65 is greater than 1200 nm, the second substrate 30, the sealing member 40, and the first substrate 20 can be damaged by the laser beam 65. On the other hand, when the wavelength of the laser beam 65 is lower than 800 nm, it is difficult to burn down the metal member 50 because of a low energy level of the laser beam 65.

Therefore, when the laser beam 65 has a wavelength in the range of about 800 nm to 1200 nm and is irradiated onto the overlapping region 56 of the metal member 50 through the opening 81, the metal member 50 can be easily burnt by absorbing the energy of the laser beam 65.

When the metal member 50 is burnt down, a portion of the sealing member 40 corresponding to the metal member 50 is also removed, thereby forming the repair region 45 and the remaining region 45a at the sealing member 40 as shown in FIG. 10. The repair region 45 can be formed on the sealing member 40 at two or more places.

The repair region 45 is defined as a region corresponding to the overlapping region 56 of the metal member 50. Since the overlapping region 56 of the metal member 50 occupies about 85% to 95% of the thickness (T) of the sealing member 40, the sealing member 40 has a thin thickness at the repair region 45. That is, the thickness of the remaining region 45a ranges from 5% to 15% of the thickness (T) of the sealing member.

As explained above, the overlapping region 56 of the metal member 50 is removed using the laser beam 65. As a result, the remaining region 45a is formed at the seaming member 40. Even when the laser beam 65 is deviated from its original optical path, the remaining region 45a can be clearly formed along an intended contour line owing to the opening 81 formed in the mask 80.

After the repair region 45 is formed at the sealing member 40, excessively injected liquid crystal is released from the LCD device 100 using the repair region 45.

To this end, a pressure is applied to the LCD device 100, and this pressure is transmitted to the liquid crystal layer 10. Then the pressure is transmitted to the sealing member 40.

When the pressure applied to the sealing member 40 is sufficiently high, the remaining region 45a of the sealing member 40 is broken at the repair region 45.

Then, some of the liquid crystal injected into the LCD device 100 is discharged through the broken remaining region 45a of the sealing member 40. Therefore, the amount of liquid crystal filled in the LCD device 100 can be properly adjusted.

Referring to FIG. 11, outside air can be introduced into the LCD device 100 through the broken remaining region 45a.

To prevent the inflow of the outside air to the LCD device 100, a photocurable material 70 is applied to the broken remaining region 45a of the sealing member 40, and light is irradiated to the applied photocurable material 70. In this way, the broken remaining region 45a of the sealing member can be resealed. It is preferable that the photocurable material 70 is an UV-curable material hardening by UV rays.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for adjusting an amount of liquid crystal in an LCD (liquid crystal display) device, the method comprising:
    injecting a liquid crystal into a liquid crystal panel having a sealing member for forming a liquid crystal receiving space;
    reducing a thickness of the sealing member at a predetermined portion of the sealing member to form a repair region;
    pressurizing the liquid crystal to break the sealing member at the repair region to discharge some of the liquid crystal from the liquid crystal receiving space, so as to adjust the amount of the liquid crystal in the liquid crystal receiving space; and
    resealing the broken repair region of the sealing member,
    wherein the reducing the thickness comprises:
    heating a metal pattern that overlaps the sealing member under the sealing member; and
    burning a portion of the sealing member that overlaps the metal pattern by the heated metal pattern,
    wherein the heating the metal pattern is performed using a laser beam.

2. The method according to claim 1, wherein the laser beam has a wavelength ranging from about 800 nm to 1200 nm.

3. The method according to claim 1, wherein the metal pattern is formed of at least one material selected from the group consisting of an aluminum, an aluminum alloy, ITO (indium tin oxide), and IZO (indium zinc oxide).

4. The method according to claim 1, further comprising forming one or more additional repair regions at the sealing member.

5. The method according to claim 1, wherein the thickness of the predetermined portion of the sealing member is about 5% to 15% of that of the sealing member.

6. The method according to claim 1, wherein the resealing of the broken repair region comprises:
    applying a photocurable material to the broken repair region of the sealing member; and
    irradiating a light to the photocurable material.

* * * * *